United States Patent [19]

Fleischman

[11] E Re. 30,592

[45] Reissued Apr. 28, 1981

[54] LARGE APERTURE EXTENDED RANGE ZOOM LENS

[75] Inventor: Andor A. Fleischman, Northbrook, Ill.

[73] Assignee: Bell & Howell Company, Chicago, Ill.

[21] Appl. No.: 871,675

[22] Filed: Jan. 23, 1978

Related U.S. Patent Documents

Reissue of:

[64] Patent No.: 4,062,621
Issued: Dec. 13, 1977
Appl. No.: 704,595
Filed: Jul. 12, 1976

U.S. Applications:

[63] Continuation-in-part of Ser. No. 625,965, Oct. 28, 1975, abandoned.

[51] Int. Cl.[2] ..... G02B 15/18

[52] U.S. Cl. ..... 350/423

[58] Field of Search ..... 350/184–187

[56] References Cited

U.S. PATENT DOCUMENTS

| | | | |
|---|---|---|---|
| 2,937,572 | 5/1960 | Yamaji | 350/184 |
| 3,360,325 | 12/1967 | Gustafson | 350/184 |
| 3,773,402 | 11/1973 | Gela et al. | 350/184 |
| 3,784,285 | 1/1974 | Watanabe | 350/184 |
| 3,885,862 | 5/1975 | Fujidka et al. | 350/186 |
| 3,972,591 | 8/1976 | Suwa | 350/184 |

*Primary Examiner*—Conrad J. Clark
*Attorney, Agent, or Firm*—Harold V. Stotland; Roger M. Fitz-Gerald

[57] ABSTRACT

Disclosed is an optical design for a variable focal length lens of large effective aperture which is focusable over an extended range including the "macro" range and is provided with a high degree of correction.

5 Claims, 33 Drawing Figures

LARGE APERTURE EXTENDED RANGE ZOOM LENS

Matter enclosed in heavy brackets [ ] appears in the original patent but forms no part of this reissue specification; matter printed in italics indicates the additions made by reissue.

This application is a continuation-in-part of Ser. No. 625,965 filed Oct. 28, 1975, and now abandoned.

*Another such lens is disclosed in the present applicant's U.S. Pat. application Ser. No. 944,341, filed Sept. 21, 1978.*

This invention relates to a variable focal length *lens* of large effective aperture, and more particularly to a variable focal length lens, focusable over an extended range, and highly corrected over a large range of magnification.

Many zoom lenses or variable equivalent focal length lenses have been designed having moderate effective apertures insofar as *they* are desired to be competitive with the existing market of photographic equipment, such as motion picture cameras. Recently, another generation of zoom lenses has been designed having unusually large apertures in the f/1.2 class. Generally, these lenses have had magnification ratios not exceeding three-to-one. Thus, the benefit of the high effective aperture has been offset against a low magnification ratio. Other lenses of lesser apertures, although of similar or slightly greater magnification ratios to the high aperture lenses, have been designed for focusing in a range of less than the normal range of approximately 1 meter to infinity. This less than normal focusing range, enabling focusing from several millimeters from the lens to the closest distance of the normal range, is referred to as the "Macro" range. Most lenses with a high aperture [of] *or* a high magnification ratio are not capable of maintaining the required high degree of correction when focusing in the macro range. Hence, only a few relatively special, and therefore generally expensive lenses have been designed and are available having the combination of features incorporated in the present lens design. Also, because of the expense of these lenses, most have not been competitive so as to receive acceptance in the mass market by the "home" movie makers.

[Another] *An* object of the invention is to provide a relatively compact and relatively inexpensive zoom lens highly corrected over a magnification range greater than the more conventional three-to-one range from zoom lens of comparable large effective apertures.

It is to be understood that the terms "front" and "rear" as used herein refer to the ends of the objective respectively nearer the long and short conjugates thereof.

Other objects and advantages of the invention will become apparent from the detailed description which follows when taken in conjunction with the accompanying drawings in which:

[FIGS. 4A to 4H are graphical representations of the various aberrations of the lens system having the design data given in Table 2 when in the wide angle mode.]

[FIGS. 5A to 5H are similar graphical representations of the Table 2 lens system when in the telephoto mode.]

Figure 1:
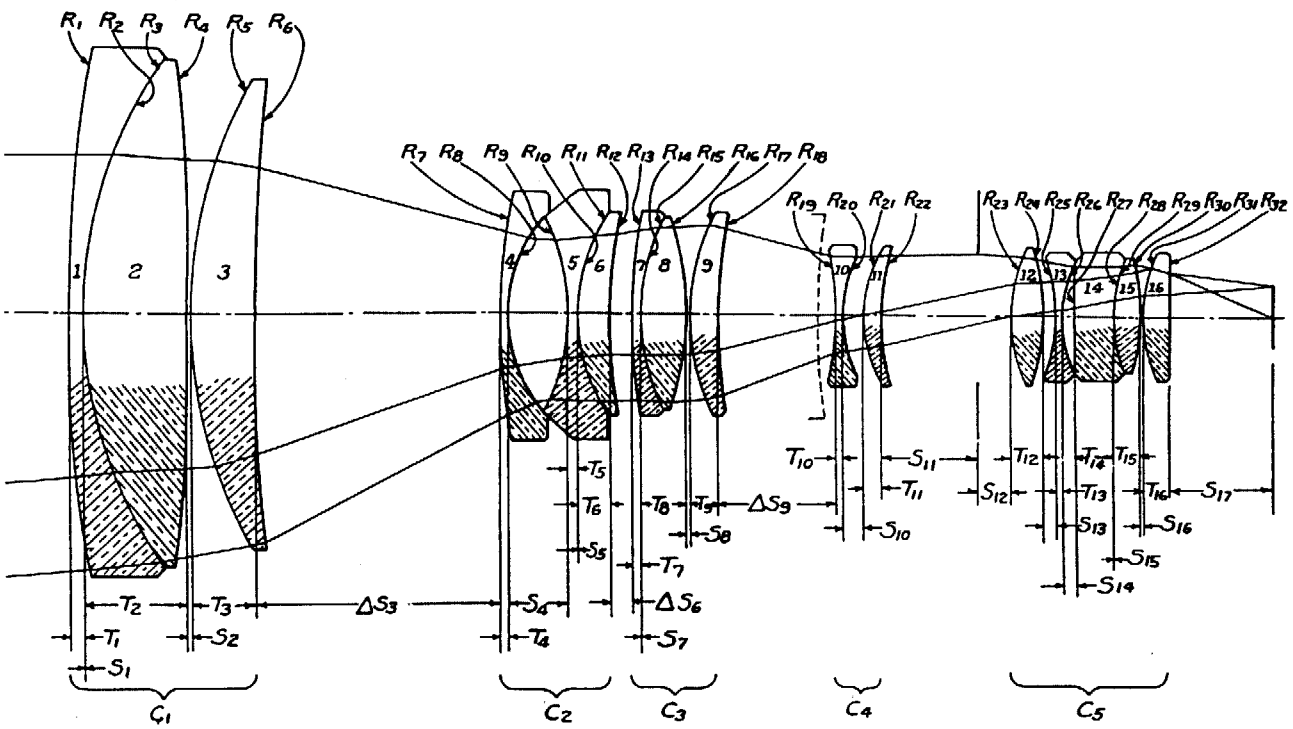
FIG. 1 is a diagrammatic sectional view of a preferred optical system according to the present invention.

Referring to the drawings, a zoom lens or variable equivalent focal length objective lens is shown. Particularly, the lens is highly corrected over a relatively large magnification range, and is capable of focus in the macro range as well as the normal range. Further, the lens has a relatively large effective aperture when compared to other lens designs having [the] *a* zoom range.

The lens includes a positive first component $C_1$, starting at the ray entrance side of the optical system, which component is adjustable axially through a short distance for focusing of the optical system throughout a range of approximately 1 meter to infinity. Component $C_2$ is a variator or negative component variable along the axis of the optical system for varying the equivalent focal length of the objective. The equivalent focal length is variable over greater than a six-to-one range of magnification while maintaining a high degree of optical correction for a large aperture of at least f/1.2 throughout the range. Component $C_3$ is a component adjustable axially upon axial adjustment of the variator, to function as a compensator for correcting aberrations caused by varying the focal length of the optical system, and being [independently] adjustable for focusing of the optical system in the macro range. Component $C_4$ is a fixed lens member for further collimating rays exiting the compensator component $C_3$. Rear component $C_5$ is a prime lens group forming an afocal system with the earlier described components.

The front component $C_1$, comprises a front biconvex cemented doublet $L_1$, $L_2$, and a rear singlet $L_3$, predominately convex forwardly and spaced close to the doublet $L_1$, $L_2$. Air spaced from the rear of the singlet $L_3$ and adjustable relative thereto is component $C_2$ which comprises a front negative meniscus singlet $L_4$ convex forwardly and a rear biconcave, cemented doublet $L_5$, $L_6$ predominately concave forwardly. The doublet has collective internal contact surfaces $R_{10}$, $R_{11}$.

Component $C_3$ is variably air spaced relative to component $C_2$ and the following component $C_4$. Component $C_3$ comprises a positive doublet $L_7$, $L_8$ predominately convex rearwardly. During a zooming or focal length varying operation, the component $C_3$ is moved axially at a rate proportional to the rate of movement of component $C_2$. However, for macro focusing action, the driver (not shown) of the components $C_2$ and $C_3$ by which axial adjustment thereof is accomplished is disconnected. [from component $C_2$ to cause that component to remain stationary while component $C_3$ is adjusted axially for focusing.]

Component $C_4$ is fixed ahead of the stop of the optical system and comprises a front negative meniscus singlet $L_{10}$ and a rear positive meniscus singlet $L_{11}$ which together form a substantially afocal system cooperating with the rear prime lens system $C_5$.

Component $C_5$ comprises a front biconvex singlet $L_{12}$, spaced somewhat from a negative element $L_{13}$. A doublet of elements $L_{14}$ and $L_{15}$ is arranged between element $L_{13}$ and rear element $L_{16}$ which is a singlet predominately convex forwardly.

The [element] *elements* $L_1$ to $L_{16}$ have spherical surfaces or radii of curvature $R_1$ to $R_{32}$, axial thicknesses $T_1$ to $T_{15}$ and axial separations $S_1$ to $S_{14}$. The separations at $S_{11}$ and $S_{12}$ are sufficient to provide clearance for an aperture adjusting stop.

A preferred embodiment of the macro focusing, large aperture, zoom lens of the invention is constructed according to the table following wherein dimensions are as set forth and the refractive indices for the sodium D line and the Abbe dispersion numbers are respectively designated at $N_D$ and V.

TABLE 1

| SYSTEM EFL | HALF ANGLE OF FIELD |
|---|---|
| at W/A = 7.22mm (.2835 in.) | 27.36° |
| at T/P = 43.86mm (1.7268 in.) | 4.46° |
| at MID = 19.25mm (.7579 in.) | 10.02° |

| LENS | RADII (mm.) | THICKNESS (mm) | SPACINGS (mm) | $N_D$ | V |
|---|---|---|---|---|---|
| 1 | $R_1$ = 166.0901 | | | | |
| | $R_2$ = −45.7200 | $T_1$ = 1.702 | | 1.755 | 27.6 |
| | | | $S_1$ = 0 | | |
| 2 | $R_3$ = 45.7200 | | | | |
| | $R_4$ = 233.4001 | $T_2$ = 11.430 | | 1.623 | 56.9 |
| | | | $S_2$ = .1016 | | |
| 3 | $R_5$ = 50.3428 | | | | |
| | $R_6$ = −301.7523 | $T_3$ = 7.112 | | 1.651 | 56.2 |
| | | | $S_3$ = 1.4910 at W/A<br>27.1882 at T/P<br>17.7851 at MID | | |
| 4 | $R_7$ = 70.3580 | | | | |
| | $R_8$ = −16.8656 | $T_4$ = 0.800 | | 1.639 | 55.4 |
| | | | $S_4$ = 6.584 | | |
| 5 | $R_9$ = −24.0030 | | | | |
| | $R_{10}$ = −19.1008 | $T_5$ = 0.800 | | 1.620 | 60.3 |
| | | | $S_5$ = 0 | | |
| 6 | $R_{11}$ = 19.1008 | | | | |
| | $R_{12}$ = −59.9948 | $T_6$ = 3.556 | | 1.785 | 25.7 |
| | | | $S_6$ = 38.3210 at W/A<br>2.7508 at T/P<br>17.1018 at MID | | |
| 7 | $R_{13}$ = 53.9750 | | | | |
| | $R_{14}$ = −21.3106 | $T_7$ = 0.800 | | 1.805 | 25.4 |
| | | | $S_7$ = 0 | | |
| 8 | $R_{15}$ = 21.3106 | | | | |
| | $R_{16}$ = 31.6230 | $T_8$ = 5.121 | | 1.640 | 60.2 |
| | | | $S_8$ = .1016 | | |
| 9 | $R_{17}$ = 23.2664 | | | | |
| | $R_{18}$ = −101.5237 | $T_9$ = 3.150 | | 1.691 | 54.8 |
| | | | $S_9$ = 1.7348 at W/A<br>11.6103 at T/P<br>6.6573 at MID | | |
| 10 | $R_{19}$ = −45.5168 | | | | |
| | $R_{20}$ = −12.8016 | $T_{10}$ = 0.711 | | 1.691 | 54.8 |
| | | | $S_{10}$ = 2.2758 | | |
| 11 | $R_{21}$ = 14.6431 | | | | |
| | $R_{22}$ = −27.4320 | $T_{11}$ = 2.091 | | 1.805 | 25.4 |
| | | | $S_{11}$ = 10.668<br>STOP<br>$S_{12}$ = 3.556 | | |
| 12 | $R_{23}$ = 17.2720 | | | | |
| | $R_{24}$ = 30.4292 | $T_{12}$ = 3.226 | | 1.774 | 44.8 |
| | | | $S_{13}$ = 1.6764 | | |
| 13 | $R_{25}$ = −19.3040 | | | | |
| | $R_{26}$ = −17.1196 | $T_{13}$ = 0.711 | | 1.805 | 25.4 |
| | | | $S_{14}$ = .8890 | | |
| 14 | $R_{27}$ = 173.1519 | | | | |
| | $R_{28}$ = −16.5100 | $T_{14}$ = 4.496 | | 1.805 | 25.4 |
| | | | $S_{15}$ = 0 | | |
| 15 | $R_{29}$ = 16.5100 | | | | |
| | $R_{30}$ = 21.8034 | $T_{15}$ = 2.794 | | 1.744 | 44.8 |
| | | | $S_{16}$ = .1270 | | |
| 16 | $R_{31}$ = 14.9758 | | | | |
| | $R_{32}$ = −424.1817 | $T_{16}$ = 3.023 | | 1.734 | 51.5 |
| | | | $S_{17}$ = 11.277<br>BFL | | |

In the Table 1 above, the first column lists the lens elements numerically starting at the ray entrance side of the system. The second column lists the respective radii of the elements in millimeters. The third column lists the axial thickness T of the respective elements in millimeters. The fourth column lists in millimeters the axial spacings between the respective elements, and the nominal image plane. EFL is the effective focal length of the lens system at wide angle condition W/A, at [telephone] *telephoto* condition T/P, and at mid range condition MID. "One-half Angle of Field" is one half the angle between the continuation of the lens axis and a line from the nodal point of the lens to the most oblique point recorded on the film when considered at the above expressed conditions.

Figure 2A:
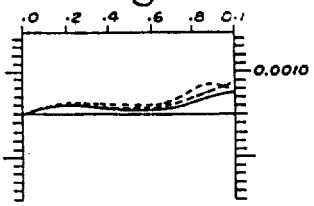
FIGS. 2A to 2H are graphical representations of the various aberrations of the lens system shown in FIG. 1 and having the design data given in Table 1 in the wide angle mode.
Figure 2B:
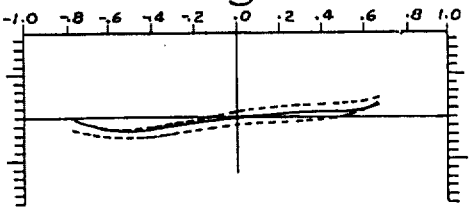
Figure 2C:
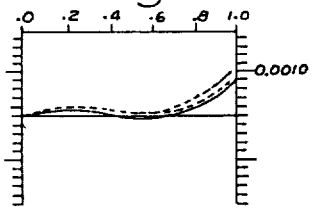
Figure 2D:
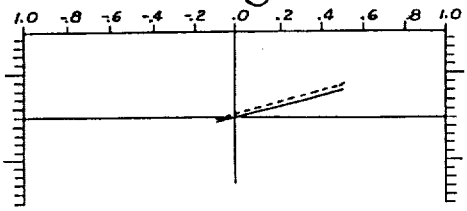
Figure 2E:
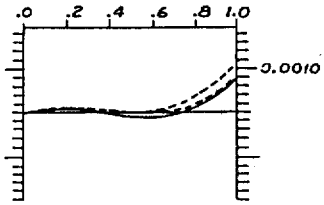
Figure 2F:
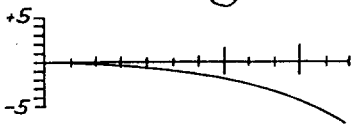
Figure 2G:
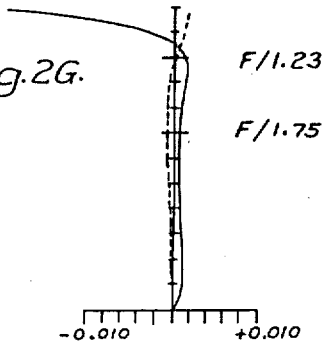
Figure 2H:
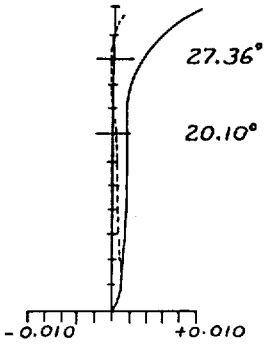
Figure 3A:
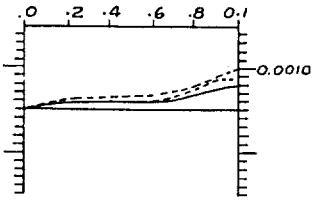
FIGS. 3A to 3H are similar graphical representations of the lens system aberrations in the telephoto mode.
Figure 3B:
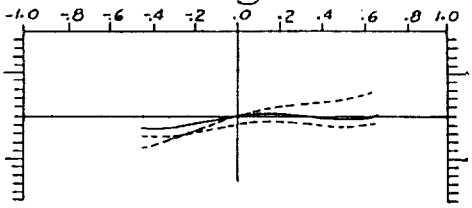
Figure 3C:
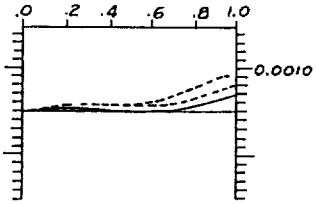
Figure 3D:
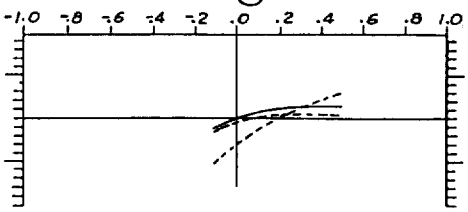
Figure 3E:
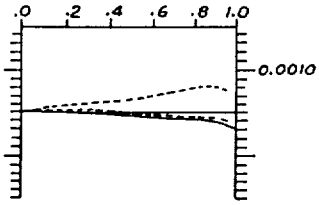
Figure 3F:
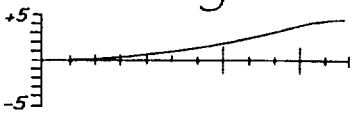
Figure 3G:
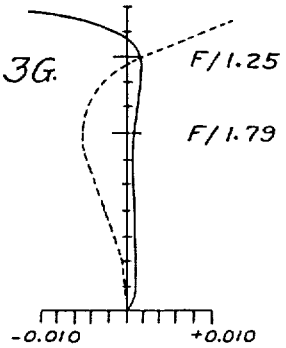
Figure 3H:
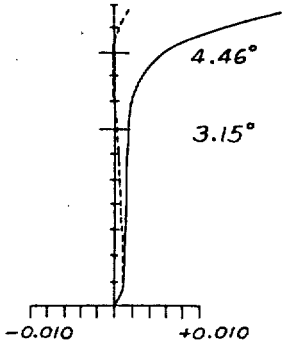

FIGS. 2A to 2H graphically represent various aberrations of the form of the optical system, as shown in FIG. 1 and having the design data recited in Table 1. FIG. 2A represents correction of the rays on axis. FIG. 2B represents off axis aberrations of rays passing from the zone of the film format and through the lens transversely and tangentially. FIG. 2C represents the aberrations of the rays passing from the corner of the film format through the lens tangentially and transversely. FIG. 2D represents the radial or longitudinal aberrations from the zone of the film format of rays entering the lens at 3 o'clock, while FIG. 2E represents similar aberrations from full field or corner rays. FIG. 2F represents distortion as a percentage of a "perfect" image. FIG. 2G represents the spherical aberrations by a full line and the offense-against-sine condition by the dotted line. FIG. 2H represents the curvature of field with tangential curvature being shown in full line and sagittal curvature being shown in dashed line.

FIGS. 3A to 3H graphically represent various aberrations of the optical system with the lens adjusted to the telephoto condition, as opposed to the wide angle condition as represented in FIGS. 2A to 2H. In FIGS. 2A to 2E and 3A to 3E, the solid line represents the aberrations of a light ray at 5893 A, the dotted line represents a light ray at 6563 A, and the dashed line a light ray at 4861 A.

[The design data of another embodiment of the optical system is shown in Table 2 set forth hereinafter. This optical system has a similar construction to the system shown in FIG. 1. FIGS. 4A to 4H, and FIGS. 5A to 5H graphically represent various aberrations related to the form of the optical system as described in the data of Table 2. The graphs in FIGS. 4A to 4H relate to the wide angle condition of the optical system, while the graphs of FIGS. 5A to 5H relate to the telephoto condition. The aberrations are identified with respect to FIGS 2A to 2H.]

[TABLE 2

| SYSTEM EFL | HALF ANGLE OF FIELD |
|---|---|
| at W/A = 7.61mm (.2997 in.) | 25.35° |
| at T/P = 56.98mm (2.2433 in.) | 3.31° |
| at MID = 25.67mm (1.0105 in.) | 7.58° |

| LENS | RADII (mm.) | THICKNESS (mm.) | SPACINGS (mm) | $N_D$ | V |
|---|---|---|---|---|---|
| 1 | $R_1$ = 240.7589<br>$R_2$ = −51.1988 | $T_1$ = 1.6510 | | 1.755 | 27.6 |
| | | | $S_1$ = 0 | | |
| 2 | $R_3$ = 51.1988<br>$R_4$ = 152.7810 | $T_2$ = 12.7000 | | 1.620 | 60.4 |
| | | | $S_2$ = .1016 | | |
| 3 | $R_5$ = 43.6880<br>$R_6$ = −139.7000 | $T_3$ = 7.7978 | | 1.651 | 55.9 |
| | | | $S_3$ = 4.2875 at W/A<br>29.5554 at T/P<br>22.3952 at MID | | |
| 4 | $R_7$ = 71.7550<br>$R_8$ = −16.5100 | $T_4$ = .8128 | | 1.639 | 55.4 |
| | | | $S_4$ = 6.6294 | | |
| 5 | $R_9$ = −24.0030<br>$R_{10}$ = −19.1008 | $T_5$ = .8382 | | 1.620 | 60.4 |
| | | | $S_5$ = 0 | | |
| 6 | $R_{11}$ = 19.1008<br>$R_{12}$ = −59.9948 | $T_6$ = 3.5052 | | 1.785 | 25.8 |
| | | | $S_6$ = 38.4048 at W/A<br>2.5857 at T/P<br>14.2570 at MID | | |
| 7 | $R_{13}$ = 58.9280<br>$R_{14}$ = −21.7424 | $T_7$ = .8890 | | 1.805 | 25.4 |
| | | | $S_7$ = 0 | | |
| 8 | $R_{15}$ = 21.7424<br>$R_{16}$ = 30.2260 | $T_8$ = 5.6388 | | 1.641 | 60.1 |
| | | | $S_8$ = .1016 | | |
| 9 | $R_{17}$ = 22.7203<br>$R_{18}$ = 93.1672 | $T_9$ = 3.1496 | | 1.691 | 54.9 |
| | | | S9 = 1.6002 at W/A<br>12.1514 at T/P<br>7.6403 at MID | | |
| 10 | $R_{19}$ = −45.5168<br>$R_{20}$ = −12.8016 | $T_{10}$ = .7112 | | 1.691 | 54.9 |
| | | | $S_{10}$ = 2.2352 | | |
| 11 | $R_{21}$ = 16.6431<br>$R_{22}$ = −27.0256 | $T_{11}$ = 2.0574 | | 1.805 | 25.4 |
| | | | $S_{11}$ = 11.0490<br>STOP<br>$S_{12}$ = 3.5560 | | |
| 12 | $R_{23}$ = 18.0848<br>$R_{24}$ = 32.8168 | $T_{12}$ = 3.6576 | | 1.744 | 44.8 |
| | | | $S_{13}$ = 1.6002 | | |
| 13 | $R_{25}$ = −21.9202<br>$R_{26}$ = −16.8656 | $T_{13}$ = .7112 | | 1.805 | 25.4 |
| | | | $S_{14}$ = .7336 | | |
| 14 | $R_{27}$ = 61.2140<br>$R_{28}$ = −14.5288 | $T_{14}$ = 4.3180 | | 1.805 | 25.4 |
| | | | $S_{15}$ = 0 | | |
| 15 | $R_{29}$ = 14.5288<br>$R_{30}$ = 26.9494 | $T_{15}$ = 3.2512 | | 1.744 | 44.8] |
| | | | $S_{16}$ = .1270 | | |

[TABLE 2-continued

| SYSTEM EFL | HALF ANGLE OF FIELD |
|---|---|
| at W/A = 7.61mm (.2997 in.) | 25.35° |
| at T/P = 56.98mm (2.2433 in.) | 3.31° |
| at MID = 25.67mm (1.0105 in.) | 7.58° |

| LENS | RADII (mm.) | THICKNESS (mm.) | SPACINGS (mm) | $N_D$ | V |
|---|---|---|---|---|---|
| 16 | $R_{31}$ = 14.7320<br>$R_{32}$ = −463.9259 | $T_{16}$ = 2.5654 | $S_{17}$ = 11.4529] | 1.734 | 51.7 |

What I claim is:

1. An optical system for a variable focal length lens of large effective aperture, which is focusable over an extended range, having substantially the following specification:

| SYSTEM ELF | HALF ANGLE OF FIELD |
|---|---|
| at W/A = 7.22mm (.2835 in.) | 27.36° |
| at T/P = 43.86mm (1.7268 in.) | 4.46° |
| at MID = 19.25mm (.7579) | 10.02° |

| Lens | Radii(mm.) | Thickness (mm.) | Spacings(mm) | $N_D$ | V |
|---|---|---|---|---|---|
| 1 | $R_1$=166.0901<br>$R_2$=−45.7200 | $T_1$=1.702 | $S_1$=0 | 1.755 | 27.6 |
| 2 | $R_3$=45.7200<br>$R_4$=233.4001 | $T_2$=11.430 | $S_2$=.1016 | 1.623 | 56.9 |
| 3 | $R_5$=50.3428<br>$R_6$=−301.7523 | $T_3$=7.112 | $S_3$=<br>1.4910 at W/A<br>27.1882 at T/P<br>17.7851 at MID | 1.651 | 56.2 |
| 4 | $R_7$=70.3580<br>$R_8$=−16.8656 | $T_4$=0.800 | $S_4$=6.584 | 1.639 | 55.4 |
| 5 | $R_9$=−24.0030<br>$R_{10}$=−10.1008 | $T_5$=0.800 | $S_5$=0 | 1.620 | 60.3 |
| 6 | $R_{11}$=19.1008<br>$R_{12}$=−59.9948 | $T_6$=3.556 | $S_6$=<br>38.3210 at W/A<br>2.7508 at T/P<br>17.1018 at MID | 1.785 | 25.7 |
| 7 | $R_{13}$=53.9750<br>$R_{14}$=−21.3106 | $T_7$=0.800 | $S_7$=0 | 1.805 | 25.4 |
| 8 | $R_{15}$=21.3106<br>$R_{16}$=31.6230 | $T_8$=5.121 | $S_8$=.1016 | 1.640 | 60.2 |
| 9 | $R_{17}$=23.2664<br>$R_{18}$=−101.5237 | $T_9$=3.150 | $S_9$=<br>1.7348 at W/A<br>11.6103 at T/P<br>6.6573 at MID | 1.691 | 54.8 |
| 10 | $R_{19}$=−45.5168 | $T_{10}$=0.711 | | 1.691 | 54.8 |

-continued

| SYSTEM ELF | HALF ANGLE OF FIELD |
|---|---|
| at W/A = 7.22mm (.2835 in.) | 27.36° |
| at T/P = 43.86mm (1.7268 in.) | 4.46° |
| at MID = 19.25mm (.7579) | 10.02° |

| Lens | Radii(mm.) | Thickness (mm.) | Spacings(mm) | $N_D$ | V |
|---|---|---|---|---|---|
| | $R_{20}$=−12.8016 | | $S_{10}$=2.2758 | | |
| 11 | $R_{21}$=14.6431<br>$R_{22}$=−27.4320 | $T_{11}$=2.091 | $S_{11}$=10.668<br>- - - STOP - - - | 1.805 | 25.4 |
| 12 | $R_{23}$=17.2720<br>$R_{24}$=30.4292 | $T_{12}$=3.226 | $S_{12}$=2.556<br>$S_{13}$=1.6764 | 1.774 | 44.8 |
| 13 | $R_{25}$=−19.3040<br>$R_{26}$=−17.1196 | $T_{13}$=0.711 | $S_{14}$=.8890 | 1.805 | 25.4 |
| 14 | $R_{27}$=173.1519<br>$R_{28}$=−16.5100 | $T_{14}$=4.496 | $S_{15}$=0 | 1.805 | 25.4 |
| 15 | $R_{29}$=16.5100<br>$R_{30}$=21.8034 | $T_{15}$=2.794 | $S_{16}$=.1270 | 1.744 | 44.8 |
| 16 | $R_{31}$=14.9758<br>$R_{32}$=−424.1817 | $T_{16}$=3.023 | $S_{17}$=11.277<br>BFL | 1.734 | 51.5 |

wherein the first column lists the lens elements numerically starting at the ray entrance side of the system; the second column lists the respective base radii $R_1$ to $R_{32}$; the third column lists the thicknesses $T_1$–$T_{16}$ of the respective elements; the fourth column lists the axial spacings $S_1$ to $S_{17}$ between the respective elements, and stop, and the image plane; and the fifth and sixth columns respectively list the index of refraction for the Sodium D line $N_D$ and the dispersive index V of the optical materials of the respective elements.

[2. An optical system for a variable focal length lens of large effective aperture, which is focusable over an extended range, having substantially the following specification:

| [SYSTEM EFL | HALF ANGLE OF FIELD |
|---|---|
| at W/A = 7.61mm (.2997 in.) | 25.35° |
| at T/P = 56.98mm (2.2433 in.) | 3.31° |
| at MID = 25.67mm (1.0105 in.) | 7.58° |

| LENS | RADII (mm.) | THICKNESS (mm.) | SPACINGS (mm) | $N_D$ | V |
|---|---|---|---|---|---|
| 1 | $R_1$ = 240.7589<br>$R_2$ = −51.1988 | $T_1$ = 1.6510 | S1 = 0 | 1.755 | 27.6 |
| 2 | $R_3$ = 51.1988<br>$R_4$ = 152.7810 | $T_2$ = 12.7000 | $S_2$ = .1016 | 1.620 | 60.4 |
| 3 | $R_5$ = 43.6880<br>$R_6$ = −139.7000 | $T_3$ = 7.7978 | $S_3$ = 4.2875 at W/A<br>29.5554 at T/P<br>22.3952 at MID | 1.651 | 55.9 |
| 4 | $R_7$ = 71.7550<br>$R_8$ = −16.5100 | $T_4$ = .8128 | $S_4$ = 6.6294 | 1.639 | 55.4 |
| 5 | $R_9$ = −24.0030<br>$R_{10}$ = −19.1008 | $T_5$ = .8382 | $S_5$ = 0 | 1.620 | 60.4 |
| 6 | [$R_{11}$ 19.1008] | | | | |

-continued

| [SYSTEM EFL | | HALF ANGLE OF FIELD |
|---|---|---|
| at W/A = 7.61mm (.2997 in.) | | 25.35° |
| at T/P = 56.98mm (2.2433 in.) | | 3.31° |
| at MID = 25.67mm (1.0105 in.) | | 7.58° |

| LENS | RADII (mm.) | THICKNESS (mm.) | SPACINGS (mm) | $N_D$ | V |
|---|---|---|---|---|---|
| | $R_{12}$ = −59.9948 | $T_6$ = 3.5052 | | 1.785 | 25.8 |
| | | | $S_6$ = 38.4048 at W/A<br>2.5857 at T/P<br>14.2570 at MID | | |
| 7 | $R_{13}$ = 58.9280 | | | | |
| | $R_{14}$ = −21.7424 | $T_7$ = .8890 | | 1.805 | 25.4 |
| | | | $S_7$ = 0 | | |
| 8 | $R_{15}$ = 21.7424 | | | | |
| | $R_{16}$ = 30.2260 | $T_8$ = 5.6388 | | 1.641 | 60.1 |
| | | | $S_8$ = .1016 | | |
| 9 | $R_{17}$ = 22.7203 | | | | |
| | $R_{18}$ = 93.1672 | $T_9$ = 3.1496 | | 1.691 | 54.9 |
| | | | S9 = 1.6002 at W/A<br>12.1514 at T/P<br>7.6403 at MID | | |
| 10 | $R_{19}$ = −45.5168 | | | | |
| | $R_{20}$ = −12.8016 | $T_{10}$ = .7112 | | 1.691 | 54.9 |
| | | | $S_{10}$ = 2.2352 | | |
| 11 | $R_{21}$ = 16.6431 | | | | |
| | $R_{22}$ = −27.0256 | $T_{11}$ = 2.0574 | $S_{11}$ = 11.0490<br>STOP<br>$S_{12}$ = 3.5560 | 1.805 | 25.4 |
| 12 | $R_{23}$ = 18.0848 | | | | |
| | $R_{24}$ = 32.8168 | $T_{12}$ = 3.6576 | | 1.744 | 44.8 |
| | | | $S_{13}$ = 1.6002 | | |
| 13 | $R_{25}$ = −21.9202 | | | | |
| | $R_{26}$ = −16.8656 | $T_{13}$ = .7112 | | 1.805 | 25.4 |
| | | | $S_{14}$ = .7336 | | |
| 14 | $R_{27}$ = 61.2140 | | | | |
| | $R_{28}$ = −14.5288 | $T_{14}$ = 4.3180 | | 1.805 | 25.4 |
| | | | $S_{15}$ = 0 | | |
| 15 | $R_{29}$ = 14.5288 | | | | |
| | $R_{30}$ = 26.9494 | $T_{15}$ = 3.2512 | | 1.744 | 44.8 |
| | | | $S_{16}$ = .1270 | | |
| 16 | $R_{31}$ = 14.7320 | | | | |
| | $R_{32}$ = −463.9259 | $T_{16}$ = 2.5654 | | 1.734 | 51.7 |
| | | | $S_{17}$ = 11.4529] | | |

wherein the first column lists the lens elements numerically starting at the ray entrance side of the system; the second column lists the respective base radii $R_1$ to $R_{32}$; the third column lists the thicknesses $T_1$–$T_{16}$ of the respective elements; the fourth column lists the axial spacings $S_1$ to $S_{17}$ between the respective elements, and stop, and the image plane; and the fifth and sixth columns respectively list the index of refraction for the Sodium D line $N_D$ and the dispersive index V of the optical materials of the respective elements.]

*3. An optical system for a variable focal length lens which is focusable over an extended range defined by a first range portion for normal object distances and a second range portion for shorter object distances, said optical system comprising:*

*a focusing component including*

*first and second elements arranged into a positive doublet, and*

*a positive third element;*

*a variator component including*

*a negative fourth element, and*

*fifth and sixth elements arranged into a negative doublet;*

*a compensator component including*

*seventh and eighth elements arranged into a positive doublet, and*

*a positive ninth element;*

*a collimator component including*

*a negative tenth element, and a positive eleventh element; and*

*a prime lens component including*

*a positive twelfth element,*

*a negative thirteenth element,*

*fourteenth and fifteenth elements arranged into a positive doublet, and*

*a positive sixteenth element;*

*all of said elements being located on a common optical axis and following one another in the order set forth; said focusing component being movable for focusing said optical system over said first range portion; said variator component being movable for variation of the focal length of said optical system; said compensator component being movable relative to said variator component for focusing of said optical system over said second range portion.*

*4. An optical system for a variable focal length lens which is focusable over an extended range defined by a first range portion for normal object distances and a second range portion for shorter object distances, said optical system comprising:*

*a focusing component including*

*first and second elements arranged into a positive doublet,*

*said first element being a negative meniscus and said second element being biconvex, and*

*a positive meniscus third element;*

*a variator component including*

*a negative meniscus fourth element, and*

*fifth and sixth elements arranged into a negative doublet,*
*said fifth element being biconcave and said sixth element being a positive meniscus;*
*a compensator component including*
*seventh and eighth elements arranged into a positive doublet,*
*said seventh element being a negative meniscus and said eighth element being biconvex, and*
*a positive meniscus ninth element;*
*a collimator component including*
*a negative biconcave tenth element, and*
*a positive meniscus eleventh element; and*
*a prime lens component including*
*a positive biconvex twelfth element,*
*a negative biconcave thirteenth element,*
*fourteenth and fifteenth elements arranged into a positive doublet,*
*said fourteenth element being a negative meniscus and said fifteenth element being biconvex, and*
*a positive sixteenth element;*
*all of said elements being located on a common optical axis and following one another in the order set forth; said focusing component being movable for focusing said optical system over said first range portion; said variator component being movable for variation of the focal length of said optical system; said compensator component being movable relative to said variator component for focusing of said optical system over said second range portion.*

*5. An optical system for a variable focal length lens which is focusable over an extended range defined by a first range portion for normal object distances and a second range portion for shorter object distances, said optical system comprising:*
*a focusing component including*
*first and second elements arranged into a positive doublet, and*
*a positive third element;*
*a variator component including*
*a negative fourth element, and*
*fifth and sixth elements arranged into a negative doublet;*
*a compensator component including*
*seventh and eighth elements arranged into a positive doublet, and*
*a positive ninth element;*
*a collimator component including*
*a negative tenth element, and*
*a positive eleventh element; and*
*a prime lens component including*
*a positive twelfth element,*
*a negative thirteenth element,*
*fourteenth and fifteenth elements arranged into a positive doublet, and*
*a positive sixteenth element;*
*all of said elements being located on a common optical axis and following one another in the order set forth.*

*6. An optical system for a variable focal length lens which is focusable over an extended range defined by a first range portion for normal object distances and a second range portion for shorter object distances, said optical system comprising:*
*a focusing component including*
*first and second elements arranged into a positive doublet,*
*said first element being a negative meniscus and said second element being biconvex, and*
*a positive meniscus third element;*
*a variator component including*
*a negative meniscus fourth element, and*
*fifth and sixth elements arranged into a negative doublet,*
*said fifth element being biconcave and said sixth element being a positive meniscus;*
*a compensator component including*
*seventh and eighth elements arranged into a positive doublet,*
*said seventh element being a negative meniscus and said eighth element being biconvex, and*
*a positive meniscus ninth element;*
*a collimator component including*
*a negative biconcave tenth element, and*
*a positive meniscus eleventh element; and*
*a prime lens component including*
*a positive biconvex twelfth element,*
*a negative biconcave thirteenth element,*
*fourteenth and fifteenth elements arranged into a positive doublet,*
*said fourteenth element being a negative meniscus and said fifteenth element being biconvex, and*
*a positive sixteenth element;*
*all of said elements being located on a common optical axis and following one another in the order set forth.*

* * * * *

UNITED STATES PATENT AND TRADEMARK OFFICE

CERTIFICATE OF CORRECTION

PATENT NO. : Re. 30,592

DATED : April 28, 1981

INVENTOR(S) : Andor A. Fleischman

It is certified that error appears in the above-identified patent and that said Letters Patent are hereby corrected as shown below:

Cover Sheet, Column 2, last line, change "33" to --17--;

Column 6, line 3, change "5893 A" to --5893 Å--;

Column 6, line 4, change "6563 A" to --6563 Å--;

Column 6, line 5, change "4861 A" to --4861 Å--;

Claim 1, Column 7, line 18, change "ELF" to --EFL--;

Claim 1, Column 7, line 21, change "(.7579)" to --(.7579 in.)--;

Claim 1, Column 8, line 13, change "ELF" to --EFL--;

Claim 1, Column 8, line 16, change "(.7579)" to --(.7579 in.)--;

Claim 1, Column 8, line 22, change $S_{12}$=2.556" to --$S_{12}$=3.556--.

Signed and Sealed this

*Twelfth* Day of *January 1982*

[SEAL]

*Attest:*

GERALD J. MOSSINGHOFF

*Attesting Officer*

*Commissioner of Patents and Trademarks*